United States Patent
Britenstine

(10) Patent No.: US 8,758,630 B1
(45) Date of Patent: Jun. 24, 2014

(54) WASTE WATER PROCESSING SYSTEM AND METHOD

(75) Inventor: Eric Britenstine, Sunbury, OH (US)

(73) Assignee: Britenstine Incorporated, Sunbury, OH (US)

(*) Notice: Subject to any disclaimer, the term of this patent is extended or adjusted under 35 U.S.C. 154(b) by 820 days.

(21) Appl. No.: 13/014,698

(22) Filed: Jan. 26, 2011

Related U.S. Application Data

(60) Provisional application No. 61/361,372, filed on Jul. 2, 2010.

(51) Int. Cl.
*C02F 1/32* (2006.01)
*C02F 1/48* (2006.01)

(52) U.S. Cl.
USPC .............. 210/748.1; 210/748.01; 210/748.11; 210/748.13; 210/153; 210/143; 422/24; 422/129; 422/186; 422/186.3; 422/134; 250/493.1; 250/494.1; 250/504 R; 250/435; 250/436

(58) Field of Classification Search
CPC ...................................... C02F 1/32; C02F 1/48
USPC .............. 210/748.01, 748.1, 748.11, 748.13, 210/153, 143, 147, 148, 175, 181, 194, 210/195.1, 252, 256, 257.1, 348; 422/24, 422/129, 134, 186.3, 243; 250/35, 436, 250/437, 493.1, 494.1
See application file for complete search history.

(56) References Cited

U.S. PATENT DOCUMENTS

| | | | |
|---|---|---|---|
| 1,193,143 A * | 8/1916 | Henri | 250/437 |
| 3,079,498 A | 2/1963 | Ruffin | |
| 3,498,457 A | 3/1970 | Gough | |
| 3,628,445 A | 12/1971 | Weber | |
| 3,924,139 A * | 12/1975 | Hirose et al. | 422/186.3 |
| 4,103,167 A | 7/1978 | Ellner | |
| 4,204,956 A | 5/1980 | Flatow | |
| 4,372,860 A * | 2/1983 | Kaas | 210/748.11 |
| 4,780,287 A | 10/1988 | Zeff et al. | |
| 4,798,702 A | 1/1989 | Tucker | |
| 4,849,115 A | 7/1989 | Cole et al. | |
| 5,208,461 A * | 5/1993 | Tipton | 250/436 |
| 5,660,719 A | 8/1997 | Kurtz et al. | |
| 5,979,054 A * | 11/1999 | Weigold et al. | 29/897.32 |
| 6,447,585 B1 | 9/2002 | Buchholz, Jr. et al. | |
| 6,565,757 B1 * | 5/2003 | Wedkamp | 210/198.1 |
| 6,784,440 B2 * | 8/2004 | Fink et al. | 250/435 |
| 7,390,406 B2 | 6/2008 | Traubenberg et al. | |
| 7,534,356 B2 | 5/2009 | Saccomanno | |
| 2002/0098109 A1 | 7/2002 | Nelson et al. | |
| 2005/0242013 A1 | 11/2005 | Hunter et al. | |
| 2006/0057020 A1 | 3/2006 | Tufo | |

* cited by examiner

*Primary Examiner* — Joseph Drodge
*Assistant Examiner* — Cameron J Allen
(74) *Attorney, Agent, or Firm* — Mueller Law, LLC; Jerry K. Mueller, Jr.

(57) ABSTRACT

A method for reducing fecal coliforms in waste water wherein the flow of water is directed through a reactor having removable cover, inlet and outlet, two UV lamps, six irradiating chambers, each interconnected by apertures, a UV lamp control box, and a heat a conducting pipe to transfer heat from the control box into the flowing water.

1 Claim, 5 Drawing Sheets

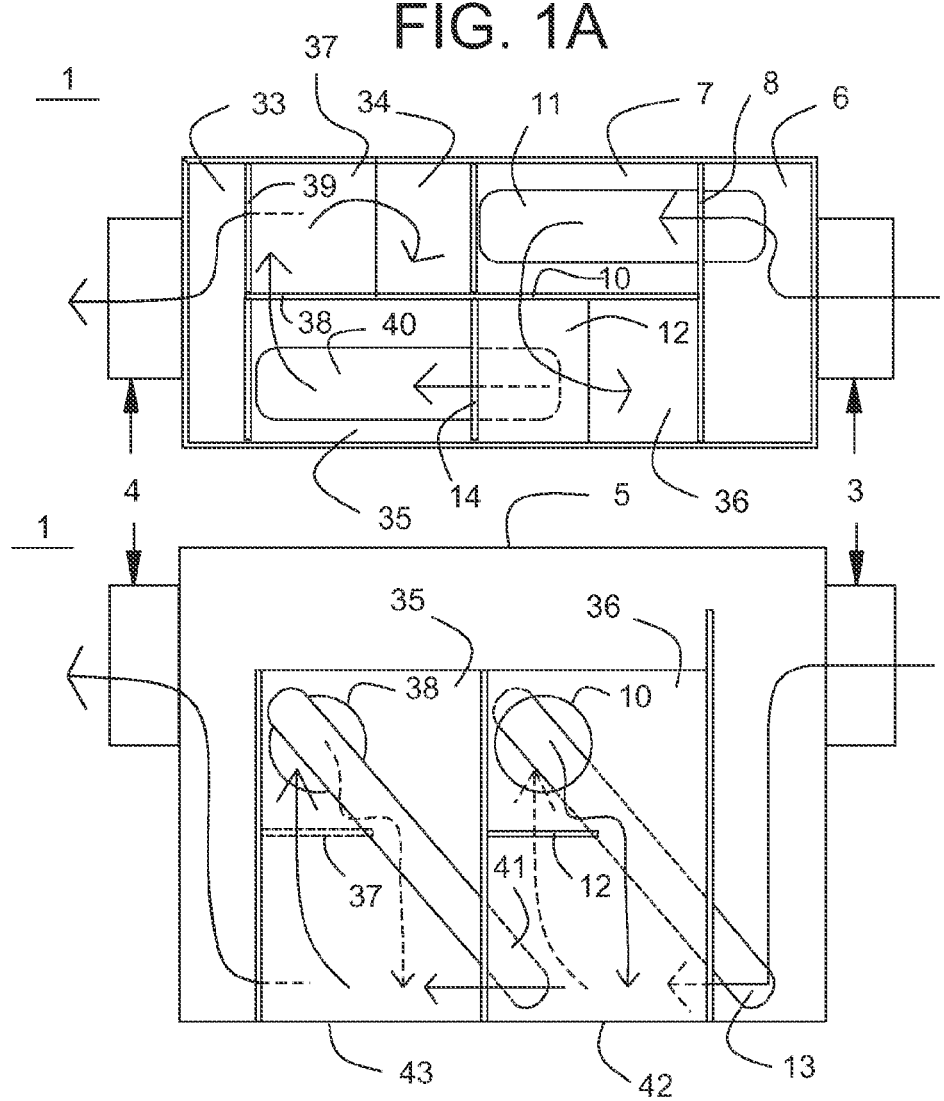

FIG. 3
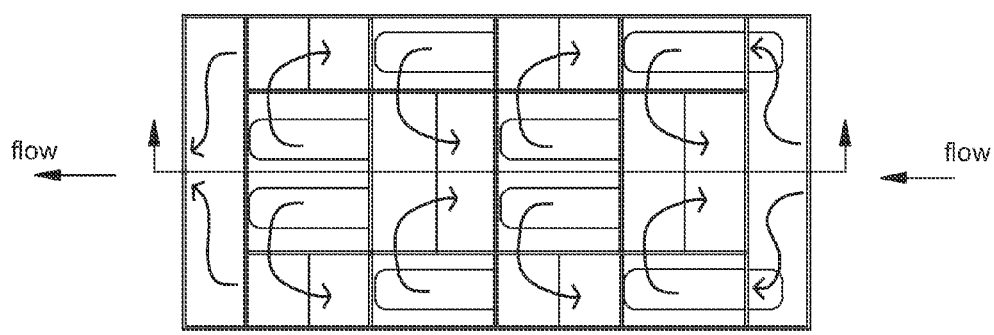
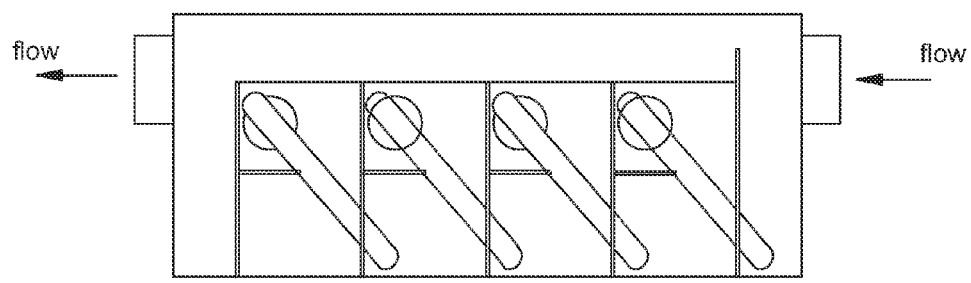
FIG. 4

WASTE WATER PROCESSING SYSTEM AND METHOD

The present application is related to the provisional patent application No. Provisional 61/361,372 Eric Britenstine filed Jul. 2, 2010, entitled "Waste Water Processing System And Method", and based on which priority is herewith claimed under 35 U.S.C. 119(e) and the disclosure of which is incorporated herein by reference in its entirety as if fully rewritten herein.

BACKGROUND AND SUMMARY

The present invention relates generally to using ultra violet light (UV) for the reduction of fecal coliforms from waste water and specifically to using UV in the 200 to 300 nm wavelength, preferably around 254 nm, to that end.

Conventional gravity fed systems utilize a chlorine contact tank fed by a sand filter to reduce the fecal coliforms. However, such systems are problematic because the chlorine must then be removed from the water. This is accomplished by adding sodium thiosulfate in order to reduce the chlorine count to acceptable levels. However, this has the undesirable effect of lowering the oxygen level in the water to undesirable limits.

The present invention overcomes these disadvantages by using UV to reduce the fecal coliforms instead of chlorine. Generally, the present invention uses UV in approximately the 254 nm range to irradiate waste water.

In one embodiment, a plurality of UV lamps are arranged within a baffle array (creating various irradiation chambers) in a reactor. The arrangement of the baffles causes water to flow in a tortuous path to maximize exposure to the lamps to ensure adequate UV dosages are applied. The flow of water is directed in an inward/outward, up/down, flow pattern as the water is exposed to the UV lamps. Other embodiments depicted in the figures show alternative arrangements of UV lamps and baffles.

BRIEF DESCRIPTION OF THE DRAWINGS

FIG. 1A depicts a top view of the reactor without cover FIG. 2A depicts a side view of the reactor as seen if sidewall were transparent FIG. 3 depicts an alternative embodiment of a reactor with additional irradiation chambers FIG. 4 depicts a side view of the alternative embodiment of FIG. 3

REFERENCE NUMERALS IN DRAWINGS

Figure 1:
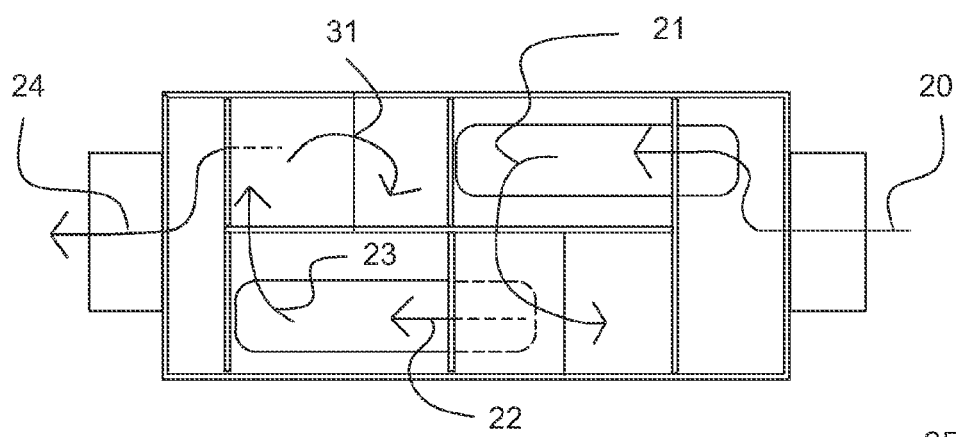
FIG. 1 depicts a top view of the reactor without cover with reference to arrows to depict water flow
Figure 2:
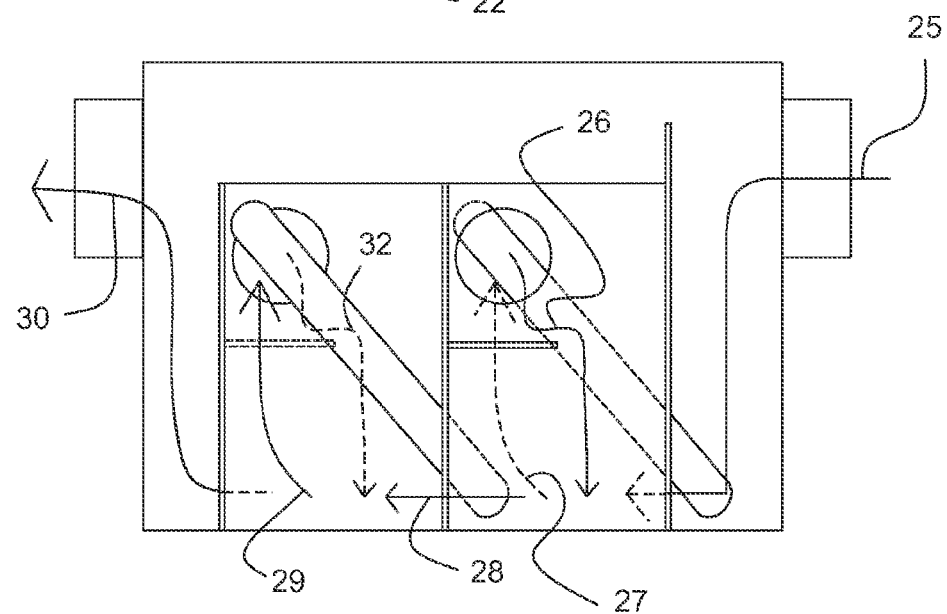
FIG. 2 depicts a side view of the reactor with reference to arrows to depict water flow

The table below lists the reference numerals employed in the figures, and identifies the element designated by each numeral.

1 reactor 1
2 cover 2 of reactor
3 inlet 3 of reactor
4 outlet 4 of reactor
5 top portion 5 of reactor
6 first irradiating chamber 6
7 second irradiating chamber 7
8 first aperture 8
9 bottom of the reactor 9
10 second aperture 10
11 first UV lamp 11
12 first horizontal shelf 12
13 lower portion of first UV lamp 13
14 third aperture 14
15 UV lamp control box 15
16 outer surface of the cover of the reactor 16
17 heat conducting pipe 17
18 inner surface of the cover of the reactor 18
19 bottom of the second irradiating chamber 19
20 directional water flow arrow 20
21 directional water flow arrow 21
22 directional water flow arrow 22
23 directional water flow arrow 23
24 directional water flow arrow 24
25 directional water flow arrow 25
26 directional water flow arrow 26
27 directional water flow arrow 27
28 directional water flow arrow 28
29 directional water flow arrow 29
30 directional water flow arrow 30
31 directional water flow arrow 31
32 directional water flow arrow 32
33 sixth irradiating chamber 33
34 fifth irradiating chamber 34
35 fourth irradiating chamber 35
36 third irradiating chamber 36
37 second horizontal shelf 37
38 fourth aperture 38
39 fifth aperture 39
40 second UV lamp 40
41 lower portion of second UV lamp 41
42 bottom of the third irradiating chamber 42
43 bottom of the fifth irradiating chamber 43
44 heat sink 44
45 wires 45
46 hole 46 in heat sink

DETAILED DESCRIPTION

A method for reducing fecal coliforms in waste water comprises the steps of providing reactor 1 having removable cover 2, inlet 3 and outlet 4, first irradiating chamber 6, second irradiating chamber 7, third irradiating chamber 36, fourth irradiating chamber 35, fifth irradiating chamber 34, sixth irradiating chamber 33, first aperture 8, second aperture 10, third aperture 14, fourth aperture 38, fifth aperture 39, first UV lamp 11, second UV lamp 40, first horizontal shelf 12, second horizontal shelf 37, UV lamp control box 15, and heat conducting pipe 17;

directing water flow downwardly from inlet 3 (arrows 20, 25) into first irradiating chamber 6, then longitudinally through first aperture 8 into second irradiating chamber 7 (arrows 20, 25), then upwardly through second irradiating chamber 7 (arrow 21), then laterally inward through second aperture 10 into third irradiating chamber 36 (arrow 27), then downwardly onto first horizontal shelf 12 in third irradiating chamber 36 (arrow 26), then downwardly from first horizontal shelf 12 to bottom 42 of third irradiating chamber 36 (arrow 26), then longitudinally through third aperture 14 (arrows 22, 28), then upwardly through fourth irradiating chamber 35 (arrow 29), then laterally outward through fourth aperture 38 (arrow 23), then downwardly onto second horizontal shelf 37 in fifth irradiating chamber 34 (arrow 32), then downwardly from second horizontal shelf 37 to bottom 43 of fifth irradiating chamber 34 (arrow 32), then longitudinally through fifth aperture 39 (arrows 24, 30), then outwardly from sixth irradiating chamber 33 through outlet 4 (arrows 24, 30).

In one embodiment, removable cover 2 is fastened to reactor 1 by a water-tight gasket and screws. In another embodiment it is hinged. It is preferred that the reactor (and UV lamp control box 15) be sealed with gasket to protect from the elements.

Inlet 3 and outlet 4 are each at substantially the same elevation and fixed near top portion 5 of reactor 1. First irradiating chamber 6 is operatively connected to inlet 3.

First irradiating chamber 6 is operatively connected to second irradiating chamber 7 by first aperture 8. first aperture 8 is longitudinally oriented, and near the bottom 9 of reactor 1.

Second irradiating chamber 7 is operatively connected to third irradiating chamber 36 by second aperture 10. Second aperture 10 is latitudinally oriented, and near the top 5 of reactor 1.

Third irradiating chamber 36 is operatively connected to fourth irradiating chamber 35 by third aperture 14 which is longitudinally oriented and near bottom 9 of reactor 1.

Fourth irradiating chamber 35 is operatively connected to fifth irradiating chamber 34 by fourth aperture 38 which is latitudinally oriented, and near top 5 of reactor 1.

Fifth irradiating chamber 34 is operatively connected to sixth irradiating chamber 33 by fifth aperture 39 which is longitudinally oriented, and near bottom 9 of reactor 1.

Sixth irradiating chamber 33 is operatively connected to outlet 4.

First UV lamp 11 is fixed within first 6 and second 7 irradiating chambers at approximately 45 degrees.

Lower portion 13 of first UV lamp 11 extends through first aperture 8.

Second UV lamp 40 is fixed within third 36 and fourth 35 irradiating chambers at approximately 45 degrees.

Lower portion 41 of second UV lamp 40 extends through third aperture 14. First aperture 8 is at same elevation as third aperture 14. Second aperture 10 is at same elevation as fourth aperture 38.

Second and fourth apertures 10, 38 are at an elevation higher than first and third 8, 14 apertures.

First horizontal shelf 12 is fixed in third irradiating chamber 36 below second aperture 10 and over lower portion 41 of second UV lamp 40.

First horizontal shelf 12 is situated over lower portion 41 of second UV lamp 40 such that water does not fall directly onto the lamp.

Second horizontal shelf 37 is fixed in fifth irradiating chamber 34 below fourth aperture 38.

UV lamp control box 15 is attached to outer surface 16 of cover 2 of reactor 1.

First and second UV lamps 11, 40 are each energized by a power cable (generally depicted as 45 in FIG. 6) running through heat conducting pipe 17 to a ballast (not shown) in UV lamp control box 15.

Each ballast is energized by an external power source (not shown).

UV lamp control box 15 houses the ballasts for UV lamps 11 & 40. Each lamp is powered by its own ballast. In one embodiment, the ballasts are firmly attached to aluminum heat sink 44 which is housed in side of control box 15.

Figure 5:
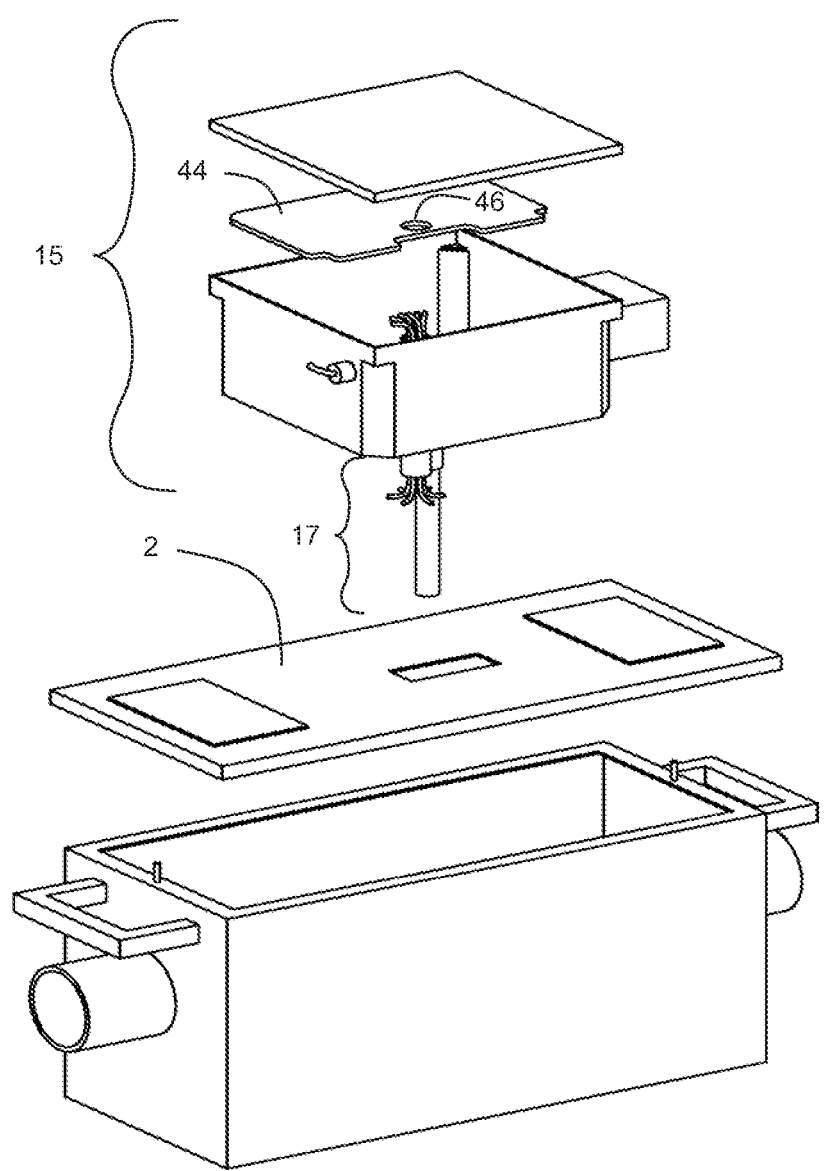
FIG. 5 depicts an exploded view of the reactor and UV light control box

Heat conducting pipe 17 is firmly attached to heat sink 44 so as to allow thermal conductivity. In one embodiment (FIG. 5), this is accomplished by inserting pipe 17 through hole 46 in heat sink 44. Hole 46 is sized to create a tight friction fit.

Heat conducting pipe 17 extends from heat sink 44 in UV lamp control box 15 through cover 2 of reactor 1 into the reactor chamber. When cover 2 is in the closed position, pipe 17 extends down into water which is flowing through the reactor. Thus, heat generated from the ballasts is transferred into the water.

A water-tight seal is provided in heat conducting pipe 17 around the electrical wires that run through it. In one embodiment, this is accomplished with an injected, dielectric, water proof material in accordance with known materials.

Figure 6:
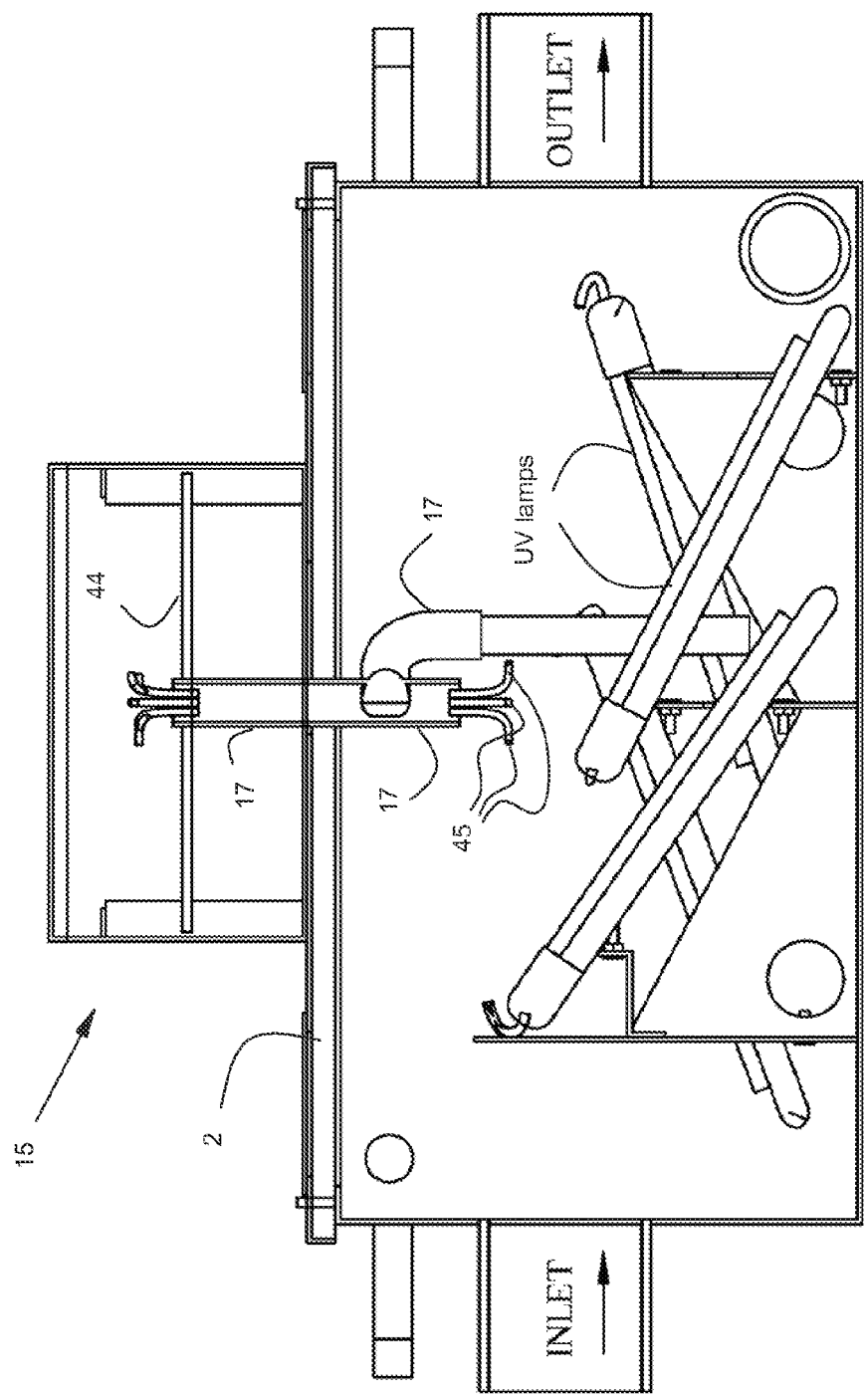
FIG. 6 depicts a side view of an alternative embodiment as seen if sidewall were transparent

In one embodiment (not shown), the ballasts are plugged into a power strip which is plugged into a GFCI device, which is connected to an external power supply through an on/off switch. FIG. 6 depicts an alternative lamp/irradiation chamber configuration wherein the heat transfer function is illustrated.

The foregoing principle of a reactor having six irradiation chambers can be extended to a larger reactor having more lamps and irradiation chambers. FIGS. 3 & 4 depict such an arrangement. The principle is the same. The flow of water is directed successively downwards and upwards, inwardly and outwardly through the various irradiation chambers as the water is irradiated with UV light.

What is claimed is:

1. A method for reducing fecal coliforms in waste water comprising the steps of:
   providing a reactor having
      a removable cover,
      an inlet and an outlet, each being at substantially the same elevation and fixed near a top portion of the reactor,
      six irradiating chambers, each being within the reactor between the inlet and outlet,
      the first irradiating chamber being operatively connected to the inlet,
      the first irradiating chamber being operatively connected to the second irradiating chamber by a first aperture, the first aperture being longitudinally oriented, and near the bottom of the reactor,
      the second irradiating chamber being operatively connected to the third irradiating chamber by a second aperture, the second aperture being latitudinally oriented, and near the top of the reactor,
      the third irradiating chamber being operatively connected to the fourth irradiating chamber by a third aperture, the third aperture being longitudinally oriented, and near the bottom of the reactor,
      the fourth irradiating chamber being operatively connected to the fifth irradiating chamber by a fourth aperture, the fourth aperture being latitudinally oriented, and near the top of the reactor,
      the fifth irradiating chamber being operatively connected to the sixth irradiating chamber by a fifth aperture, the fifth aperture being longitudinally oriented, and near the bottom of the reactor,
      the sixth irradiating chamber being operatively connected to the outlet,
      a first UV lamp being fixed within the first and second irradiating chambers at approximately 45 degree relative to the base of the container,
         a lower portion of the first UV lamp extending through the first aperture,
      a second UV lamp being fixed within the third and fourth irradiating chambers at approximately 45 degree relative to the base of the container, a lower portion of the second UV lamp extending through the third aperture, the first aperture being at the same elevation as the third aperture, the second aperture being at the same elevation as the fourth aperture, the second and fourth apertures being at an elevation higher than the first and third apertures, a first horizontal shelf being fixed in the third irradiating chamber below the second aperture and over the lower portion of the second UV lamp, a second horizontal shelf being fixed in the fifth irradiating chamber below the fourth aperture and over the lower portion of the second UV lamp, a UV lamp control box attached to an outer surface of the cover of the reactor, a heat conducting pipe being fixedly attached to an inner surface of the cover of the reactor, and further being in thermal communication with the UV lamp control box, the first and second UV lamps each being energized by a power cable running through the heat conducting pipe to a ballast in the UV lamp control box, the ballast being energized by an external power source, the heat conducting pipe extending downwardly into the reactor when the reactor cover is in the closed position whereby the heat conducting pipe is in thermal communication with water flowing through the reactor;

directing water flow, downwardly from the inlet into the first irradiating chamber, then longitudinally through the first aperture into the second irradiating chamber, then upwardly through the second irradiating chamber, then laterally inward through the second aperture into the third irradiating chamber, then downwardly onto the first horizontal shelf in the third irradiating chamber, then downwardly from the first horizontal shelf to the bottom of the third irradiating chamber, then longitudinally through the third aperture, then upwardly through the fourth irradiating chamber, then laterally outward through the fourth aperture, then downwardly onto the second horizontal shelf in the fifth irradiating chamber, then downwardly from the second horizontal shelf to the bottom of the fifth irradiating chamber, then longitudinally through the fifth aperture then outwardly from the sixth irradiating chamber through the outlet.

\* \* \* \* \*